March 13, 1934.  A. E. LARSEN  1,950,411
SUSTAINING BLADE FOR AIRCRAFT ROTORS
Filed May 6, 1931  4 Sheets-Sheet 2
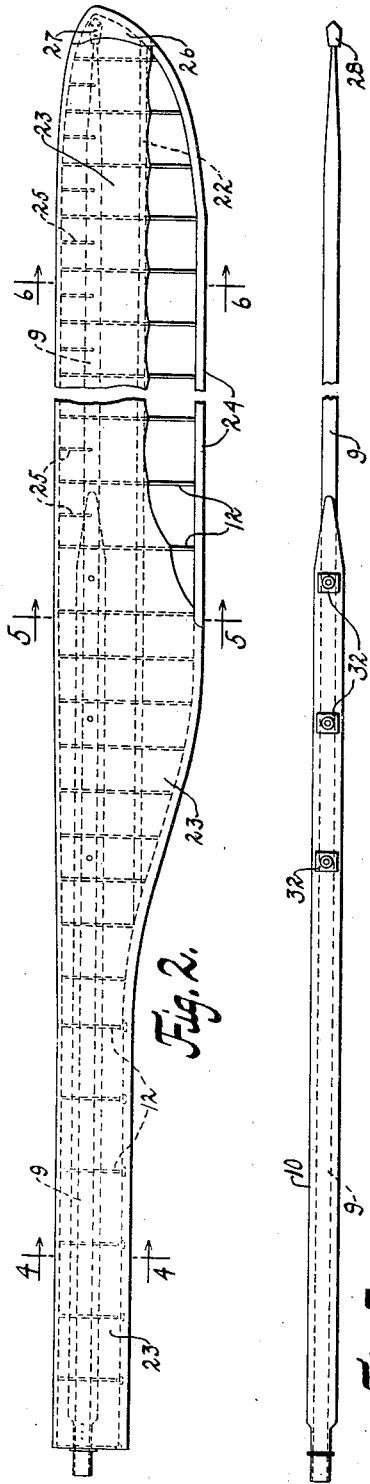
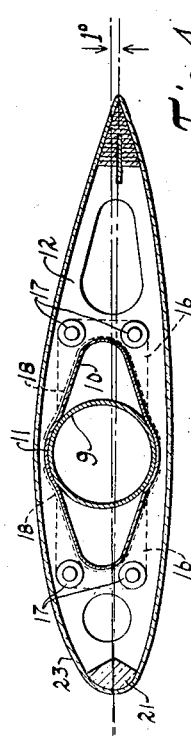
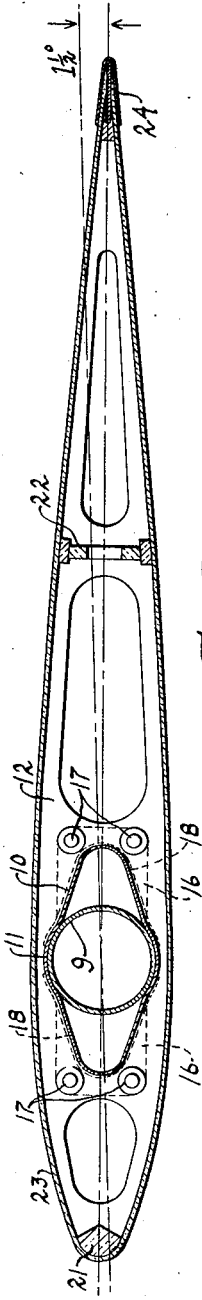
INVENTOR.
Agnew E. Larsen
BY Synnestvedt + Lechner
ATTORNEYS.

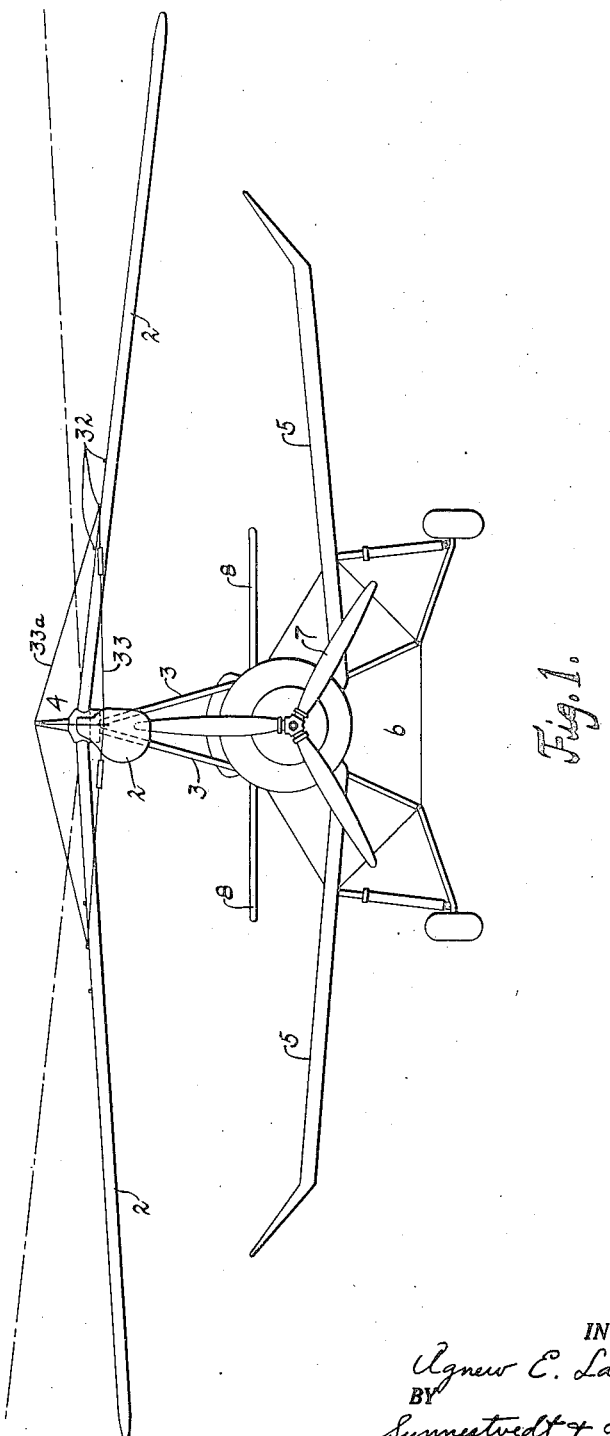

March 13, 1934. A. E. LARSEN 1,950,411
SUSTAINING BLADE FOR AIRCRAFT ROTORS
Filed May 6, 1931 4 Sheets-Sheet 3
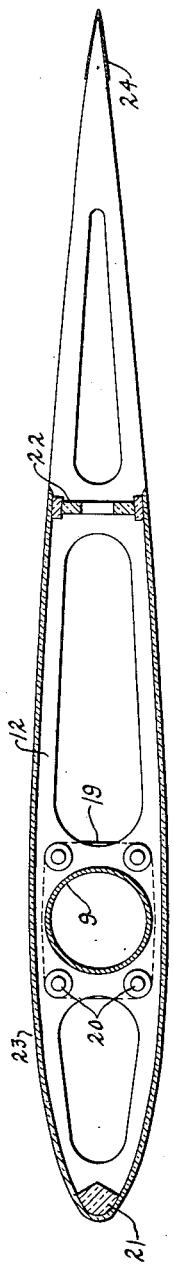
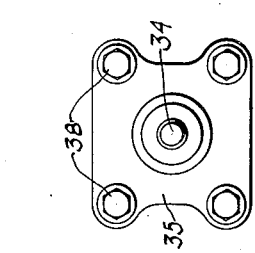
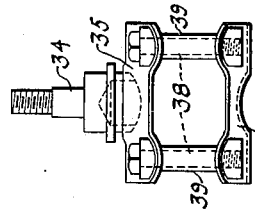
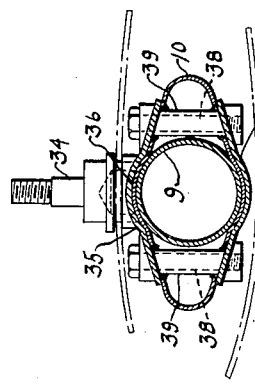
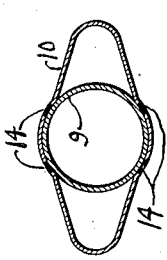
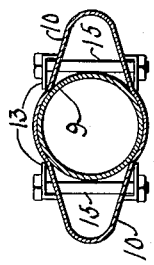
INVENTOR.
Agnew E. Larsen
BY
Synnestvedt & Lechner
ATTORNEYS.

March 13, 1934.  A. E. LARSEN  1,950,411
SUSTAINING BLADE FOR AIRCRAFT ROTORS
Filed May 6, 1931   4 Sheets-Sheet 4
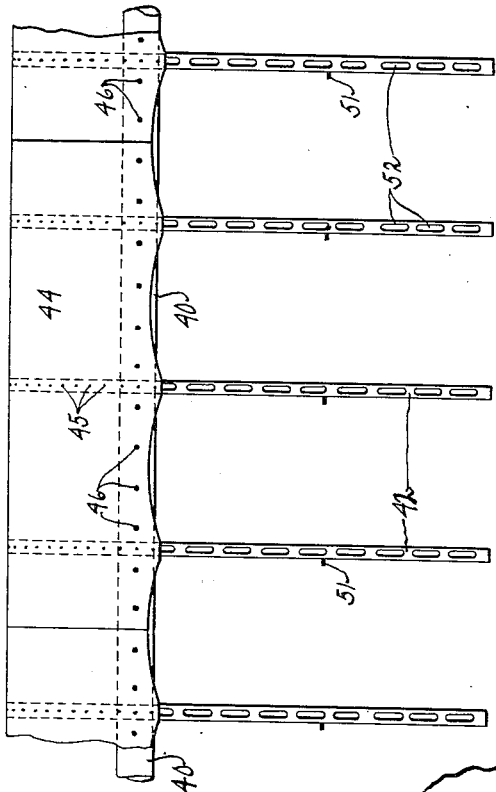
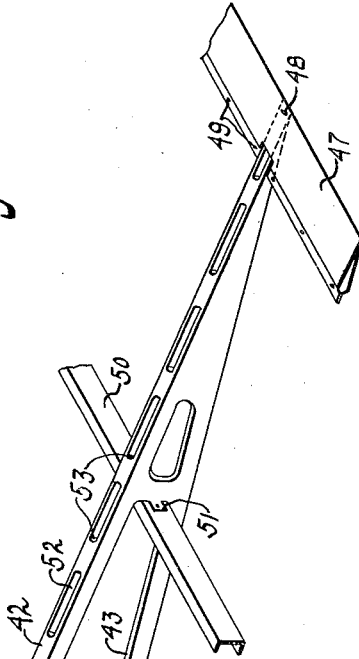
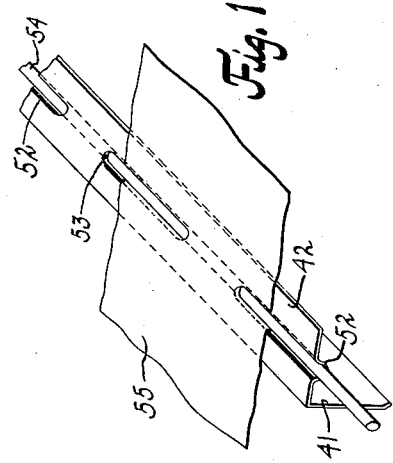
INVENTOR.
Agnew E. Larsen
BY
Synnestvedt & Lechner
ATTORNEYS.

Patented Mar. 13, 1934

1,950,411

UNITED STATES PATENT OFFICE 1,950,411

SUSTAINING BLADE FOR AIRCRAFT ROTORS

Agnew E. Larsen, Huntingdon Valley, Pa., assignor to Autogiro Company of America, Philadelphia, Pa., a corporation of Delaware Application May 6, 1931, Serial No. 535,375

37 Claims. (Cl. 244—19)

This invention relates to sustaining blades for aircraft rotors and is especially useful in a sustaining rotor of the type in which a plurality of blades are mounted for rotation about a common substantially vertically disposed axis under the influence of relative air-flow in flight. The constructions of the present invention, furthermore, are particularly adapted for use in rotors of this character in which each of the individual blades is articulated or pivoted to the hub of supporting structure in order that the blades may be free to move with respect to each other under the influence of various flight forces, such as, inertia, lift, drag and anti-drag, and the like.

Such individual blade movements are provided for (as first disclosed in copending application of Juan de la Cierva, Serial No. 145,655, filed November 1st, 1926) and issued May 24, 1932 as Patent No. 1,859,584 in order to compensate for variations in aerodynamical and other forces to which they are subjected in flight operation, the variations, it being noted, resulting particularly from translational movement of the craft in the atmosphere.

The blade constructions herein disclosed, are in certain respects, similar to those disclosed in the copending application of Juan de la Cierva, Serial No. 532,603, filed April 24th, 1931, at least in general plan form and their aerofoil section. The present invention, however, contemplates certain improvements over the blade constructions disclosed in the last above mentioned copending application.

Generally considered, the primary objects of the present invention involve improvements in blade construction, particularly from the standpoint of actual manufacture or assembly and from the standpoint of rigidity and flexibility in certain planes in order to afford maximum efficiency in flight operation. More specifically, the present invention has in view a blade construction embodying a main spar structure and ribbing, the whole assembly being arranged or constructed in such manner that the center of pressure approximately coincides with the spar structure, this being advantageous from the standpoint of strength as against various thrusts and forces incident to flight operation.

Further, the present invention contemplates a blade construction of the type just referred to in which the center of gravity is disposed rearwardly of the spar structure in order to provide for certain torsional and elastic deformation in flight, various advantages of such deformation being considered more in detail in the said copending application of Juan de la Cierva, Serial No. 532,603, filed April 24th, 1931. It should be noted, however, that this torsional deformation or deflection is provided for, in accordance with the present invention, by a disposition of the center of pressure and center of gravity different from that disclosed in said copending application.

While the present invention has in view utilizing certain advantages of the torsional deflection referred to, at the same time it contemplates a somewhat more restricted deflection than that provided for in the aforesaid application. Furthermore, with such relatively restricted torsional deflection, in order to obtain the maximum efficiency, I have found it to be desirable to initially set the inner and outer sections of the blade at different, initial, effective incidences. More specifically, the blade of this invention is built preferably with a slight positive blade incidence adjacent the root and with a somewhat increased positive incidence of the blade in the outer end portion thereof, it being noted that the incidences here mentioned result from initial settings and not from the effect of flight forces on the blade.

In this way, certain advantages of increased positive incidence in the outer portions of the blades are obtained in a construction having somewhat more limited torsional flexibility and, as a result, somewhat greater general strength.

As a further object, the present invention makes provision for the attachment of blade interconnecting and droop cables at a plurality of points on each blade so that adjustments may readily be made to meet different flying or operating conditions.

Still further, according to the present invention, a blade may be built up from a plurality of subassemblies, generally resembling box-like blade sections. These sections, in accordance with this disclosure, may advantageously and conveniently be made entirely of metallic parts, with a fabric covering applied to the whole if desired. In this connection it should be observed that while the box-like metallic sections herein disclosed are arranged to complete only the forward portion of the blade shape, still these sections may be completed throughout the entire width of the blade. Furthermore, in the embodiment illustrated, the trailing portion of the blade may suitably be completed or defined by fabric conveniently be supported on metallic ribbing elements which, in the preferred arrangement, constitute an integral part of the subassemblies or blade sections.

The box-like blade sections of the present invention are also arranged to be threaded onto a spar structure, one adjacent another, in position to be secured to each other, for example, as by means of welding. This structure, as will readily be understood, effects material economies in manufacture and assembly and, in addition, affords maximum robustness or general strength for any particular blade weight.

As a further object, it might be noted that the present invention makes provision for a blade spar construction which affords a high degree of rigidity within the general path of travel of the blades. At the same time, considerable transverse flexibility, i. e., flexibility for bending in a generally vertical path, is maintained, this being desirable in aiding attainment of equilibrium in blade positions to compensate for various forces to which the blades are subjected in flight. Rigidity in the general path of travel is also desirable for various other reasons more fully pointed out in the copending application above referred to. However, in accordance with the present invention this rigidity is enhanced by the use of a spar structure including a member of circular cross section surrounded and engaged by a member of substantially oval or elliptical section, this strengthening or elliptical member being disposed or arranged with its larger diameter or dimension extended in the general plane of the blade.

Furthermore, in accordance with the present invention, blade construction embodying such strengthening means is arranged to provide greater flexibility in the outer end portion by termination of the oval reenforcing part or parts at a point preferably not less than approximately one-third the total blade length from the outer end thereof, for example, in the neighborhood of the center. This spar construction, it might be noted, is effective in somewhat limiting the torsional flexure or deformation particularly toward the inner end of the blade, although the termination of the strengthening means at a point spaced substantially from the blade tip provides for torsional flexibility which is sufficient to permit deformation of the outer blade portion.

How the foregoing, together with the various other objects and advantages which will appear more fully hereinafter are obtained, will be apparent from the following discussion taken with the accompanying drawings illustrating two forms of blade construction.

Figure 1 is a somewhat diagrammatic front view of an aircraft having a sustaining rotor made up of blades constructed in accordance with the present invention;

Figure 2 is a somewhat diagrammatic plan view of one form of blade, the blade here shown having the outer covering or fabric therefor removed;

Figure 3 is a plan view of the blade spar construction embodied in the blade of Figure 2;

Figures 4, 5 and 6 are enlarged sectional views of the blade of Figure 2, these views being taken, respectively, substantially as indicated by the section lines 4—4, 5—5 and 6—6;

Figure 7 is an enlarged sectional view of the spar structure shown in Figure 3 and particularly illustrating one means which may be employed in securing various parts of the spar structure to each other;

Figure 8 is a view similar to Figure 7 but illustrating a modified means of spar assembly;

Figures 9, 10 and 11 are enlarged detail views of the means employed for the attachment of blade inter-connecting cables;

Figures 12 and 13 illustrate, somewhat diagrammatically, certain details of the blade ribs illustrated in Figure 2 and the manner in which fabric covering may be applied thereto;

Figure 14 is a fragmentary top plan view of a modified blade construction, made up of a plurality of box-like sections in the manner above referred to;

Figure 15 is a fragmentary prospective view of a portion of one of the blade sections illustrated in Figure 14; and Figure 16 is an enlarged detail view illustrating a method of fabric attachment which may be adopted in the construction of Figures 14 and 15.

As will be seen from inspection of Figure 1, the aircraft of the character to which the present invention relates includes a set of sustaining blades 2 mounted for rotation at the top of a supporting or pylon structure composed of a plurality of leg members 3. The axis mechanism for the set of sustaining blades is indicated in general by the reference numeral 4 and, while the details of this mechanism are not disclosed herein, as they form no part of the present invention per se, still it should be understood that this axis structure includes a plurality of pivot joints for each blade in order that they may be free, independently, to assume various positions under the influence of varying inertial, aerodynamic and other forces to which they are subjected in flight operation. It might also be noted that in the preferred arrangement the pivots or articulations are arranged to provide for individual blade movements both within as well as transversely of the general or mean path of travel thereof. Various characteristics of the construction and operation of articulated sustaining rotors of this type are now known in this art and are more fully set forth in the copending applications of Juan de la Cierva, Serial No. 145,655, filed November 1st, 1926, and Serial No. 500,064, filed December 4th, 1930.

Additionally, craft of this general type may be provided with laterally extended and supplementary fixed wing sections 5—5 which are provided and particularly arranged in certain positions with respect to the sustaining rotor all for numerous reasons more fully set forth in the copending application last referred to above and also in the copending application of Juan de la Cierva, Serial No. 414,901, filed December 18th, 1929.

The craft illustrated in Figure 1 is further provided with landing gear 6, a propeller 7 and tail surfaces such as indicated at 8. These parts also need not be considered in detail herein although it is noted that various features of the landing gear here illustrated are described and claimed in the copending application of Agnew E. Larsen, Serial No. 528,280, filed April 7th, 1931 and issued July 11, 1933, as Patent No. 1,917,530.

Turning now to the more detailed views (Figures 2 to 13 inclusive) illustrating one form of rotor blade embodying various features of the present invention, attention is first called (making particular reference to Figure 2) to the fact that in plan form the blade has an inner or root end portion of somewhat reduced chord and an outer or primary lifting portion of somewhat larger chord, the trailing edges of these two portions being interconnected by an inclined trailing edge of a short intermediate section of inwardly decreasing chord.

The blade construction itself includes a main spar structure composed, in the preferred arrangement, of a tubular member 9 of circular cross section, this member being extended substantially throughout the entire length of the blade and being arranged at its inner end in such manner as to be connected or secured to pivot joint parts (not shown). The spar structure also includes strengthening means in the form of a casing 10 of substantially oval or elliptical section. This casing or stengthening means is preferably extended from a point adjacent the root end of the blade outwardly thereof to a point in the vicinity of the center of the blade. The cross sectional configuration of the strengthening sheath 10, as well as the relation thereof to the spar member 9 is more clearly illustrated in Figures 4 and 5. From inspection of these figures it will be seen that the casing 10 is arranged with its larger diameter or dimension extended in the general plane of the blade itself. Also, as appears in these figures, the element 10 is somewhat deformed at its upper and lower sides in order to provide somewhat extended surface contact with the member 9. This extended contact is indicated at 11.

As appears most clearly in Figures 7 and 8 the means of attachment of the elements 9 and 10 to each other may either take the form of through bolts 15 arranged at opposite sides of the member 9 with bracket members 13 positioned to rigidly clamp the parts together upon tightening the bolts (Figure 7), thus eliminating piercing of the central spar member 9, or take the form of soldered or welded interconnections as indicated at 14.

The blade itself is built up on this spar structure by means of ribs 12 which, of course, are of smaller chord toward the root end of the blade than in the outer portion thereof, as clearly illustrated in Figure 2, and, in addition, are preferably more closely spaced in the intermediate tapered blade section (joining the inner or small chord part and the outer or large chord part) than in the inner and outer sections themselves, this being advantageous in providing good support for the trailing edge of this tapered section.

The ribs 12 may be secured to the spar structure by means of pairs of brackets or plate-like members 16 attached to the ribs themselves by means of bolts or rivets 17 and having laterally extended flanges 18 formed to embrace the spar structure. The joining of these various parts may be completed, for example, by means of welding. As best seen in Figures 4 and 5, the ribs which are secured to the spar structure along the section thereof which is reenforced by the casing 10, are provided with brackets 16 having flanges 18 formed to the elliptical or oval configuration of the strengthening casing, which automatically effects proper alinement of the ribs.

On the other hand, those ribs which are secured to the spar structure outwardly beyond the point of termination of the casing 10 may suitably be provided with attaching bracket plates 19, riveted to the ribs as at 20 and having openings therein of circular form to fit the member 9. These plates 19, if desired, may also be provided with attachment tabs or flanges in order to facilitate welding to the member 9, or such plates may be soldered or welded directly to the member 9 without the use of flanges such as those indicated at 18 in Figures 4 and 5.

In order to strengthen the leading or entering edge of the blade, it may be reenforced by means of an element 21 extended throughout the entire length of the blade and engaging each one of the ribs thereof at its nose portion. Still further, in the portion of the blade of larger plan form or chord, an additional supplementary spar or strengthening element 22 may be provided, this element, in the preferred arrangement, being extended outwardly substantially in line with the trailing edge of the inner or relatively small chord portion of the blade.

The camber or cross sectional configuration of the blade may be determined and substantially fixed by means of a relatively rigid covering or enclosure, for example, of plywood or plymetal, the latter being preferable. This covering, as shown in Figures 2 and 4, completely encloses the inner or narrow section of the blade, the covering itself being designated by the reference numeral 23. Furthermore, as shown in Figures 2 and 6, the stiff blade covering, in its outer portion, is terminated rearwardly of the blade at a point adjacent to the reenforcing element 22. In order to reenforce or strengthen the tapered portion of the blade which connects or joins its inner and outer sections, the rigid covering or enclosure is preferably extended over the entire blade as illustrated in Figure 5.

An additional strengthening element 24 in the form of a metal channel of V-section is extended over the trailing edge of the blade in the portion or section thereof which is not completely enclosed by the plymetal 23, i. e., in the outer portion of the blade. This element, of course, is formed to receive the rear tip of each one of the spars 12 which are disposed in this particular section of the blade.

The internal blade structure may also include small ribbing elements 25 alternating in position with those numbered 12. As illustrated in Figure 2 these ribs 25 are applied only in the outer section of the blade beyond the point of termination of the oval casing 10. It will also be apparent from inspection of this figure that the ribs 25 extend only from the leading edge of the blade rearwardly to engage the spar structure. If desired, a metallic tip or cap 26 may be applied to the outer extremity of the blade and secured thereto as by means of bolts or rivets 27 taking into the lug or ear 28 which is mounted at the tip of the spar member 9.

It should also be pointed out, at this point, that this rigid skin structure for the blade is arranged to reenforce the entire assembly, particularly by co-operation with the spar structure to form a relatively rigid box at the leading edge of the blade.

The surfacing of the blade may conveniently be completed first by the application of one or more layers of fabric applied in the blade sections which are not covered by the skin 23. To facilitate attachment of these layers of fabric the ribs are provided with cut-out or recessed portions 29 (see Figs. 12 and 13). As appears most clearly in Figure 13 these recesses 29 are suitably rounded at their corners in order to prevent fraying or damage to the fabric and are utilized to receive attaching cord or strengthening 30 which may be placed over the top of the fabric 31 and drawn downwardly into the recesses and thus avoid the projection of such cords above the final blade surface.

After application of the fabric in the portion of the blade just referred to, the entire blade surface may be covered with one or more layers of fabric doped thereon.

This blade construction, therefore, provides for great robustness and general strength with a minimum total weight, it being noted particularly that the relatively light fabric covering is employed in the trailing edge portion of the blade where the air pressure normally is relatively low.

Before proceeding with a discussion of various other characteristics of a blade constructed in this manner, it should be noted that, as seen in Figure 3, the blade spar is preferably provided with a plurality of spaced devices 32 which are arranged for the attachment of blade interconnecting and droop cables such as those indicated at 33 and 33a in Figure 1. These cables are employed, as more clearly brought out in the copending application of Juan de la Cierva, Serial No. 145,655, filed November 1st, 1926, to control or partly restrict certain individual blade movements. Under various flying or operating conditions it may be desirable to alter the points of reaction of the interconnecting cables 33. Such adjustments may readily be made by the use of a plurality of attachment devices secured to each blade spar.

The nature and manner of attachment of these devices to the spar structure is illustrated in detail in Figures 9 to 11. Here, it will be seen, each of these devices includes an upwardly extended connection bolt or spindle 34 supported on a bracket or clamp member 35, preferably having a central portion deformed or curved to fit the upper and external surface of the oval casing 10 as indicated at 36 in Figure 9. A complementary bracket or clamp 37 is disposed below the blade spar and the two are rigidly clamped together as by means of through bolts 38 arranged at each side of the spar member 9 and penetrating the elongated portions of the casing 10. Sleeve members 39 surrounding the bolts 38 serve to space the brackets 35 and 37 from each other and thus prevent undue distortion of the casing 10 when the through bolts 38 are tightened. In addition to serving as an attachment or support for the blade interconnection pins 34, these bracket or clamp structures serve to secure the strengthening casing 10 to the internal tubular spar member 9 in a manner similar to that described above in connection with Figure 7.

From inspection of Figures 2, 4, 5 and 6 it will be noted that the spar structure is disposed relatively close to the leading edge of the blade. Specifically, the arrangement is such that the center of pressure of the blade substantially coincides with the spar structure. The advantages of such an arrangement, of course, lie primarily in the strength which results as against bending and twisting moments. Constructing a blade in accordance with the present invention, furthermore, results in minimum weight in the trailing edge portion thereof with the result that the center of gravity of the blade falls at a point only slightly behind the spar structure, even though the latter is further forward than usual. While it is desirable to relatively position the center of pressure and the center of gravity in such way as to provide for certain torsional and elastic flexure under flight conditions, as fully discussed in the copending application of Juan de la Cierva first identified above, still, in accordance with the present invention, this torsional flexibility is somewhat restricted in the interest of general strength throughout the blade.

Furthermore, with this in mind and in order to provide the most efficient incidence setting for the inner and outer portions of the blade, the inner portion is preferably initially set at a slightly positive incidence and the outer portion, in the preferred arrangement, is set at a positive incidence slightly greater than that of the inner section. With such initial blade settings, only a slight torsional flexibility need be provided in order to result in the desired degree of positive incidence setting at the tip of the blade as compared to the setting at its inner or root end.

The incidence settings according to the present invention may be, for example, substantially as follows:

At the root end approximately ½° to 1° is preferable while 1½° to 3° is employed at the tip or at least in the outer portion of the blade, these settings being those which are "built in" during the blade construction. The torsional flexure, which results, of course, from the disposition of the center of gravity slightly behind the center of pressure, in accordance with this invention, increases the incidence at the tip to a point at which the net positive setting is, for example, between 3½° and 5°.

The blade of the present invention, therefore, has great strength and at the same time is constructed in such manner as to provide for the desirable greater positive incidence at the tip than at the root, the present invention accomplishing or attaining this condition by a combined initial or fixed setting, together with limited torsional and elastic flexibility.

Furthermore, for reasons which are brought out more clearly in the copending application of Juan de la Cierva first identified above, it is preferable to construct the inner portion of the blade of relatively "high-lift" aerofoil section and the outer portion of the blade of a "low-lift" or symmetrically cambered section. From inspection and comparison of Figures 4, 5 and 6 it will be seen that this variable aerofoil section has been incorporated in the blade construction of the present invention. In Figure 4 a relatively high-lift blade section is shown while in Figures 5 and 6, these latter views being taken in the outer portion of the blade, symmetrically cambered sections are indicated. In the present invention, however, the positive lift incidence setting of the outer (symmetrical) portion of the blade is greater than the positive lift incidence setting of the inner (unsymmetrical) portion of the blade, whereby the ultimate variable incidence desired in flight is partially due to initial construction and partially due to torsional flexure in flight.

In Figures 14, 15 and 16 I have illustrated a somewhat modified sustaining blade construction embodying various features and affording various advantages referred to above. At the outset, it should be noted that this form of blade is particularly adapted to metallic construction of a character which produces substantial economies in manufacture and which, at the same time, is very convenient from the standpoint of assembly or repair.

In accordance with this form a tubular spar member 40 of circular section is extended substantially throughout the entire length of the blade similarly to the spar structure of Figures 2 and 3. Here, however, the spar strengthening sheathing 10 of the construction above described may be omitted and this modified structure is otherwise arranged to afford the strength and rigidity contemplated by this invention.

It is preferable in this embodiment to form or build up the blade from a number of sub-assemblies or independent blade sections which may be threaded onto the main spar 40. One complete and two fragmentary blade sections of this character are illustrated in Figure 14. Although the section here shown includes three blade rib elements (together with other parts) it will be understood that more or less than three ribs may be built into each one of the sub-assemblies.

The ribs are illustrated in Figures 14, 15 and 16 by the reference numeral 41 and by particular reference to Figure 15 it will be seen that these ribs take the form of flanged and cut-out elements which may suitably be fabricated from sheet metal, as by stamping. Each rib has upper and lower flanges 42 and cut-out portions in the web of the rib in order to lighten the structure. The openings or cut-out portions may be of any suitable shape or arrangement and in accordance with the preferred embodiment the edges of the openings are also flanged, as by stamping, as indicated in Figure 15 at 43. At the point of maximum depth of the blade ribs, each one of them is provided with a circular opening adapted to receive the similarly shaped spar member 40. Turning again to Figure 14 it will be seen that three ribs of this general type are arranged in or projected into a rigid metallic sheathing 44. When so positioned the groups of ribs included in each sub-assembly are attached to the associated box or casing section 44 by means of rivets or spot welding indicated at 45 in Figures 14 and 15. After fabrication of a plurality of blade sections they are preferably threaded onto a spar 40 in the manner illustrated in Figure 14, and the ribs 42 may then be secured, as by welding, to the spar, for which purpose flanges 56 may also be provided around the spar-receiving apertures of the ribs. In view of the depth of the spar receiving apertures and in order to lend additional strength the flanges 56 are preferably formed to extend oppositely from the marginal or covering attachment flanges 42.

Still further, as will be apparent from inspection of Figure 15, in the preferred arrangement, the spar-receiving openings in the ribs are disposed at the point of maximum depth of the blade, in this connection it being pointed out that with the various parts here under consideration properly proportioned as to weight and the like the center of pressure is arranged to coincide with the spar 40.

Still further, according to this form a relatively large diameter spar is employed. Indeed, the spar 40 shown in Figure 15 is of such diameter as to require an opening in the rib webs extended throughout the entire width thereof. In other words, the openings in the ribs which are arranged to receive the spar 40 substantially meet the juncture between the rib webs and their upper and lower flanges 42. Stated in still another way it should be noted that the upper and lower flanges 42 of each rib are spaced from each other a distance substantially equal to the diameter of the spar 40.

Bearing this in mind it will be apparent that the sheet metal skins 44 of the sub-assemblies may be directly secured as by spot welding 46 to the spar 40 at points intermediate the rib flanges 42. In this way a very strong and rigid box-like structure is built up at the leading edge of the blade, and if desired, may even be extended substantially rearwardly of the main spar. In the preferred arrangement, however, having light weight particularly in mind, the rigid skin or box cover 44 is terminated just behind the spar 40.

After assembly of a plurality of box-sections in this manner the trailing edge of the blade may be reenforced by means of a V-shaped channel 47 arranged to embrace the rear tip of each spar. This channel 47 may be attached to the ribs by welding or rivets such as indicated at 48 in Figure 15 and, additionally, may have its edges deformed to abut against each other in order that they may be secured together as indicated at 49. This closed "V-channel" affords relatively great strength and prevents sagging or "concaving" of the blade covering when it is drawn or stretched therearound.

An auxiliary or supplemental strengthening spar element 50, disposed similarly to the element 22 of Figure 2, may be applied to this blade structure. This part may advantageously take the form of a standard or commercial channel which is attached to the ribs by means of tabs 51 formed to extend transversely of the rib webs.

In finishing or completing a blade constructed in this manner one or more layers of fabric or the like are first applied to the rear or openwork portion of the blade and attached to the ribs in this portion in the manner illustrated in Figure 16. Here it will be seen that the rib flanges 42 are indented or recessed as at 52, the indentations being spaced from each other and being provided at each end with apertures 53 (see Figs. 15 and 16). A suitable cord or wire 54 is arranged to lie in the recesses 52 and is threaded through the apertures 53 from one recess into the next. The fabric itself 55 will also be suitably apertured in its application in this manner and is secured to the rib flanges 42 by means of the wires 54. If it is desired to have an all metal blade construction, this fabric may be replaced by a thin all metal skin. Similarly to the blade form first described this method of attachment avoids cord or attaching members projecting beyond the ultimate surface of the blade. It will also be understood that the entire blade, after application of fabric to the trailing portion thereof, may be provided with a completely enclosing fabric covering suitably doped to afford a smooth finished blade surface, or the fastening cord or wire may be covered by application of tape over each rib, as shown in said copending application of Juan de la Cierva, Serial No. 532,603.

In considering the advantages of the blade construction of Figures 14, 15 and 16, attention is first called to the fact that, in common with the modification first discussed, the various parts may be so arranged and proportioned as to locate the center of pressure along the blade spar and the center of gravity rather closely spaced therebehind. In this way the advantages of such a construction hereinbefore noted are attained in a metallic blade structure which is still further advantagesous in being composed of box-like sections. This box-like structure may also incorporate the incidence settings, both initial and incident to torsional flexure, all as above more fully pointed out.

However, with the metallic structure of Figures 14, 15 and 16 sufficient rigidity as against torsional and lateral bending strains is attained without the use of supplementary or auxiliary reenforcing means for the blade spar. This greater rigidity or strength, without the use of supplementary reenforcement, results in large part from the use of a spar of relatively large diameter, i. e., of a diameter substantially equal to the maximum depth of the blade. The desirable rigidity of the blade within its general path of rotative travel is provided, at least in large part, by virtue of the fact that the rigid skin 44 is directly secured to the spar 40. This box structure, however, being arranged with its long dimensions lying substantially within the plane of the blade, does not materially restrict the desirable flexibility transversely of the general plane of the blade.

In view of the foregoing it will be apparent that the blade of Figures 14, 15 and 16 is arranged to afford various of the advantages hereinbefore pointed out, particularly with respect to center of pressure and center of gravity location, by the use of readily fabricated parts and in a manner which is highly efficient from the standpoint of assembly and repair. The sectional metallic box structure may also be adapted for other locations of the center of pressure and center of gravity or for other incidence settings.

What I claim is:—

1. An aircraft rotatable sustaining blade construction built with an outer portion set at a positive incidence as compared with the setting in an inner portion, the blade being arranged for elastic torsional deformation to increase the difference between the effective incidence of the inner and outer portions under the influence of flight forces.

2. An aircraft rotatable sustaining blade construction built with an outer portion set at a positive incidence as compared with the setting in an inner portion, the center of gravity of the blade being disposed rearwardly of its center of pressure to provide elastic torsional deformation to increase the difference between incidence settings in inner and outer portions of the blade under the influence of flight forces.

3. An aircraft rotatable sustaining blade construction built with an outer portion set at a positive incidence as compared with the setting in an inner portion, the center of gravity of the blade being disposed rearwardly of its center of pressure to provide elastic torsional deformation to increase the difference between incidence settings in inner and outer portions of the blade under the influence of flight forces, together with a blade spar structure disposed substantially at the center of pressure at least in the outer portion of the blade.

4. A blade for aircraft sustaining rotors, including a spar structure and ribbing elements, the latter being apertured substantially at the point of maximum depth to engage the spar structure, together with a covering for the blade, all of said parts being relatively arranged and proportioned in such manner that the center of pressure of the blade falls substantially along the spar structure and the center of gravity of the blade is disposed rearwardly of the center of the spar structure.

5. A blade construction for a sustaining rotor of the multiple-blade type, said construction including a spar structure having greater rigidity, generally, edgewise of the blade than transversely thereof, together with a stiff covering applied to the blade at least in its leading edge portion.

6. In a rotatable sustaining blade for aircraft a main spar structure including substantially elliptical strengthening means disposed in the blade with its larger diameter arranged substantially in the general plane of the blade.

7. In a rotatable sustaining blade for aircraft a main spar structure including substantially elliptical strengthening means disposed in the blade with its larger diameter arranged substantially in the general plane of the blade, and blade ribbing engaging said means.

8. In a rotatable sustaining blade for aircraft a main spar structure including substantially elliptical strengthening means disposed in the blade with its larger diameter arranged substantially in the general plane of the blade, said means having a deformed portion providing materially extending surface contact with another portion of the spar structure.

9. In a rotatable sustaining blade for aircraft a main spar structure including a member of circular cross section, and strengthening means for the structure of substantially oval section extending lengthwise of and surrounding the circular member, said means being disposed with its larger dimension arranged substantially in the general plane of the blade.

10. In a rotatable sustaining blade for aircraft a main spar structure including a member of circular cross section, and strengthening means for the structure of substantially oval section extending lengthwise of and surrounding the circular member, said means being disposed with its larger dimension arranged substantially in the general plane of the blade, and said means having a deformed portion providing extended surface contact with said member.

11. In a rotatable sustaining blade for aircraft a main spar structure including substantially elliptical strengthening means disposed in the blade with its larger diameter arranged substantially in the general plane of the blade, the strengthening means being extended lengthwise of the blade and terminating, in its outer end, short of the outer end of the blade.

12. In a rotatable sustaining blade for aircraft a main spar structure including substantially elliptical strengthening means disposed in the blade with its larger diameter arranged substantially in the general plane of the blade, the strengthening means being extended lengthwise of the blade and terminating, in its outer end, short of the outer end of the blade, and said point of termination being spaced not substantially less than one third the total length of the blade from the outer end thereof.

13. In a rotatable sustaining blade for aircraft a main spar structure including substantially elliptical strengthening means disposed in the blade with its larger diameter arranged substantially in the general plane of the blade, the strengthening means being extended outwardly, approximately one half of the total blade length, substantially from the root end thereof.

14. In a rotatable sustaining blade for aircraft a main spar structure including a member of circular cross section, and strengthening means for the structure of substantially oval section extending lengthwise of and surrounding the circular member, said means being disposed with its larger dimension arranged substantially in the general plane of the blade, together with means for securing the strengthening means to said member including a securing member extended through the strengthening means externally of the said member.

15. In a rotatable sustaining blade for aircraft a main spar structure including a member of circular cross section, and strengthening means for the structure of substantially oval section extending lengthwise of and surrounding the circular member, said means being disposed with its larger dimension arranged substantially in the general plane of the blade, together with means for securing the strengthening means to said member including a clamping device operative between opposed sides of the strengthening means to clamp the said member therebetween.

16. A rotatable sustaining blade for aircraft sustaining rotors, said blade including a tubular main spar and a rigid skin directly secured, in sections, to the spar.

17. A rotatable sustaining blade for aircraft sustaining rotors, said blade including a tubular main spar, ribbing elements secured, in sections, to the spar and a rigid skin directly secured to the spar.

18. A rotatable sustaining blade for aircraft sustaining rotors, said blade including a tubular main spar, ribbing elements secured, in sections, to the spar and a rigid skin directly secured to the spar and to the ribbing elements.

19. A rotatable sustaining blade for aircraft sustaining rotors, said blade being formed of a plurality of box-like sections positioned adjacent each other lengthwise of the blade, each of said sections including ribbing and rigid skin covering secured thereto.

20. A rotatable sustaining blade for aircraft sustaining rotors, said blade being formed of a plurality of box-like sections positioned adjacent each other lengthwise of the blade, each of said sections including a plurality of ribs interconnected by a section of rigid skin covering.

21. A rotatable sustaining blade for aircraft substaining rotors, said blade including a structural member extended lengthwise thereof and a plurality box-like blade sections threaded onto said member.

22. A rotatable sustaining blade for aircraft sustaining rotors, said blade including a structural member extended lengthwise thereof and a plurality boxlike blade sections threaded onto said member, each of the sections being composed of ribbing and rigid blade-enclosing elements.

23. A blade for aircraft sustaining rotors, including a spar structure and ribbing elements, the latter comprising relatively thin metallic web and flange portions, and each ribbing element having an aperture in its web to engage the spar structure, an aperture dimension and a transverse dimension of the spar structure being substantially equal to the depth of the rib-web.

24. In an aircraft, a pivotally and rotatably mounted sustaining blade arranged for actuation by relative air-flow and including longitudinal tension means as the main load-carrying structure and a plurality of box-like aerofoil sections mounted serially on said means and secured thereto as against dislodgment by centrifugal force of rotation.

25. In an aircraft, a pivotally and rotatably mounted sustaining blade arranged for actuation by relative air-flow and including longitudinal tension means as the main load-carrying structure and a plurality of box-like metal shell aerofoil sections mounted serially on said means and secured thereto as against dislodgment by centrifugal force of rotation.

26. A substantially all-metal rotative sustaining blade including a longitudinal tension spar, and metallic box-like aerofoil sections secured thereto as against relative rotation under air pressure and as against longitudinal dislodgement under centrifugal force of rotation.

27. An aircraft rotative sustaining blade having a framework of all-metal construction including transverse rib members and a secondary longitudinal stiffening member attached to the transverse rib members and brackets formed integrally with the ribs for attaching said member thereto.

28. A sustaining wing for aircraft having a metal trailing edge stringer of general V-section but having the forward edges closed.

29. A sustaining blade for an aircraft having an all-metal framework, the trailing edge stringer being of general V-section with its forward edges closed.

30. An aircraft rotative sustaining blade having a framework including transverse rib members and a secondary longitudinal stiffening member attached to the transverse rib members and brackets formed integrally with the ribs for attaching said member thereto.

31. In an aircraft a rotative sustaining blade mounted for pivotal and displacement movements under the action of relative air-flow and other forces in flight, said blade having structural elements spaced apart lengthwise thereof, the spacing being less between elements in a mid portion of the blade than it is in an end portion thereof.

32. In an aircraft a rotative sustaining blade mounted for pivotal and displacement movements under the action of relative air-flow and other forces in flight, said blade having structural elements thereof spaced apart lengthwise thereof, the spacing being less between elements in a mid portion of the blade than it is in the inner and outer end portions thereof.

33. In an aircraft a rotative sustaining blade mounted for pivotal and displacement movements under the action of relative air-flow and other forces in flight, said blade having an inner substantially parallel-sided portion, an outer substantially parallel-sided portion, and an intermediate tapered portion joining said portions, and structural elements for the blade spaced apart lengthwise thereof, the spacing being less between elements in the said tapered portion of the blade than it is in an adjoining parallel-sided portion.

34. A rotatable sustaining blade for aircraft including a spar structure, rib elements and covering material, the rib elements being apertured to engage the spar structure, being flanged at one side thereof adjacent the spar-receiving apertures, and being flanged at the other side thereof to engage the covering material.

35. For an aircraft multi-bladed sustaining rotor constituting the primary means of sustension for the craft, a sustaining blade normally fixed at its root end as against bodily change in incidence setting, said blade including a spar structure, ribbing, and a blade covering, the spar, ribbing and covering being arranged in such manner that the center of pressure, during normal flight operation, falls substantially along the spar, and the center of gravity is disposed rearwardly of the center of pressure.

36. A blade or wing for an aircraft sustaining rotor, said wing being composed, in general, of two structures, one of which is a spar structure extending generally lengthwise of the wing and the other of which is a wing contour-defining structure, the structure last mentioned being formed of a plurality of box-like sections positioned adjacent each other along the spar structure and fixedly secured to each other in such adjacent positions, the said two structures being interconnected in such manner that at least a portion of the loads or stresses of said sections set up by centrifugal force during rotation is carried or taken by the spar structure.

37. For an aircraft sustaining rotor in which there are blades or wings mounted upon a central upright axis for free rotation under the action of relative airflow, an auto-rotatable wing of long and narrow plan form and aerofoil section comprising a main longitudinally extending metallic spar structure located near the sectional center of gravity and extending in to the root end of the wing in position to serve as the main means of attachment or mounting of the wing, a plurality of flanged metallic transverse ribs spaced apart along said spar structure and secured thereto, a trailing edge member substantially paralleling the spar structure and secured to a plurality of ribs in position to relatively locate and hold the rear ends of said plurality of ribs and being mounted on said ribs in such manner as to be carried by the spar structure, through the intermediation of the ribs, as against centrifugal and other forces in flight, the flanges of the metallic ribs lying substantially at right angles to the planes of the ribs and being positioned approximately coincident with the contour line of the wing section, said flanges being indented at spaced intervals along the length of the ribs and being apertured at the ends of adjacent indentations, a sheathing or covering material overlying the ribs and the trailing edge member in position to form the aerofoil-defining surface of the rotative wing and apertured at intervals longitudinally of the ribs with said apertures registering with the rib flange apertures, and sheathing retaining wires recessed in said rib flange indentations and extending through the flange and sheathing apertures in position to retain the sheathing in fixed position on the ribs and flat against the outer surfaces of the flanges, the depth of the flange indentations being substantially as great as the thickness of the wires so that the external surface of the sheathing presents a substantially smooth exterior for the wing whereby a smooth and uniform auto-rotative aerofoil section is presented to the relative airflow in flight over a wide variety of angles of said airflow as encountered during the rotation of the wing.

AGNEW E. LARSEN.